US012270937B2

United States Patent
Raghavan

(10) Patent No.: US 12,270,937 B2
(45) Date of Patent: Apr. 8, 2025

(54) DETECTION OF AN UNKNOWN RANK-1 SIGNAL IN INTERFERENCE AND NOISE WITH UNKNOWN COVARIANCE MATRIX

(71) Applicant: Government of the United States, as represented by the Secretary of the Air Force, Wright-Patterson AFB, OH (US)

(72) Inventor: Ramachandran S Raghavan, Centerville, OH (US)

(73) Assignee: United States of America as represented by Secretary of the Air Force, Wright-Patterson AFB, OH (US)

( * ) Notice: Subject to any disclaimer, the term of this patent is extended or adjusted under 35 U.S.C. 154(b) by 255 days.

(21) Appl. No.: 18/117,168

(22) Filed: Mar. 3, 2023

(65) Prior Publication Data

US 2023/0204719 A1    Jun. 29, 2023

Related U.S. Application Data

(63) Continuation-in-part of application No. 17/479,641, filed on Sep. 20, 2021, now abandoned.

(60) Provisional application No. 63/080,889, filed on Sep. 21, 2020.

(51) Int. Cl.
   *G01S 7/40*    (2006.01)
   *G08B 21/18*   (2006.01)

(52) U.S. Cl.
   CPC .............. *G01S 7/40* (2013.01); *G08B 21/182* (2013.01)

(58) Field of Classification Search
   CPC .................................. G01S 7/40; G08B 21/182
   See application file for complete search history.

(56) References Cited

U.S. PATENT DOCUMENTS

| | | | |
|---|---|---|---|
| 6,380,887 B1* | 4/2002 | Suen ..................... | G01S 7/2923 342/162 |
| 2016/0025849 A1* | 1/2016 | Wang ................. | G01S 13/5244 342/59 |
| 2018/0074192 A1 | 3/2018 | Rector et al. | |
| 2018/0164406 A1* | 6/2018 | Culkin .................. | G01S 7/2923 |
| 2020/0116851 A1 | 4/2020 | Raghavan | |
| 2021/0208270 A1 | 7/2021 | Raghavan | |
| 2022/0091232 A1 | 3/2022 | Foreman | |
| 2022/0091249 A1 | 3/2022 | Raghavan | |
| 2023/0059452 A1 | 2/2023 | Schuman et al. | |

OTHER PUBLICATIONS

C.D. Richmond, "Performance of a class of adaptive detection algorithms in nonhomogeneous environments," IEEE Trans on Signal Processing, vol. 48 (2000) 1248-1262.
S. Kraut et al., "The adaptive coherence estimator: a uniformly most-powerful-invariant adaptive detection statistic," EEE Trans. Signal Processing., vol. 53 (2005) 427-438.
S. Bidon et al., "The adaptive coherence estimator is the generalized likelihood ratio test for a class of heteroeneous environments," IEEE Signal Processing Letters, vol. 15 (2008) 281-284.
R. S. Raghavan et al., "Chapter 3: Subspace detection for adaptive radar detectors and performance analysis," IN Modern Radar Detection Theory. Ed: A. De Mario et al (2016) SciTech Publishing.
R. S. Raghavan; A Generalized Version of ACE and Performance Analysis, IEEE Transactions On Signal Processing, 2020, 68, 2574-2585.

* cited by examiner

*Primary Examiner* — Bernarr E Gregory
*Assistant Examiner* — Hailey R Le
(74) *Attorney, Agent, or Firm* — AFMCLO/JAZ; James F. McBride

(57) ABSTRACT

The present invention relates to radar systems and methods of using same that are more efficient than current radar systems and methods of using same. Such radar systems and methods of using same using employs a plurality of pluses is used to make a decision on the presence or absence of a target. Such radar system and method of using same is more efficient as the position and velocity of a potential target is carried over from pulse burst to pulse burst. Thus, the radar signal structure from the target is the same, which in turn results in a high cross correlation that can used to efficiently decide if signal return is from an actual target or is due to interference.

6 Claims, No Drawings

DETECTION OF AN UNKNOWN RANK-1 SIGNAL IN INTERFERENCE AND NOISE WITH UNKNOWN COVARIANCE MATRIX

CROSS-REFERENCE TO RELATED APPLICATION

The present application is a continuation-in-part of U.S. patent application Ser. No. 17/479,641 filed Sep. 20, 2021, which in turn claims priority to U.S. Provisional Application Ser. No. 63/080,889 filed Sep. 21, 2020, the contents of both such priority applications hereby being incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to radar systems and methods of using same.

BACKGROUND OF THE INVENTION

Current radar system and the methods of using same are inefficient as they require multiple testing of a reflected signal because the position and velocity of a potential target will be initially unknown. Applicants recognized that the source of such problem was that current radar systems use single burst of pluses to make a decision on the presence or absence of a target.

As a result of the aforementioned recognition Applicants, developed a radar system and method of using same wherein a plurality of pluses is used to make a decision on the presence or absence of a target. Such radar system and method of using same is more efficient as the position and velocity of a potential target is carried over from pulse burst to pulse burst. Thus, the radar signal structure from the target is the same, which in turn results in a high cross correlation that can used to efficiently decide if signal return is from an actual target or is due to interference.

SUMMARY OF THE INVENTION

The present invention relates to radar systems and methods of using same that are more efficient than current radar systems and methods of using same. Such radar systems and methods of using same using employs a plurality of pluses is used to make a decision on the presence or absence of a target. Such radar system and method of using same is more efficient as the position and velocity of a potential target is carried over from pulse burst to pulse burst. Thus, the radar signal structure from the target is the same, which in turn results in a high cross correlation that can used to efficiently decide if signal return is from an actual target or is due to interference.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

As used in this specification, the words "about," "approximately," or the like, when accompanying a numerical value, are to be construed as indicating a deviation as would be appreciated by one of ordinary skill in the art to operate satisfactorily for an intended purpose.

As used in this specification, the words "and/or" means, when referring to embodiments (for example an embodiment having elements A and/or B) that the embodiment may have element A alone, element B alone, or elements A and B taken together.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Method of Improving a Radar System

Applicants disclose a method for improving a radar unit's efficiency comprising, for a pre-specified probability of false alarm and a set of pre-specified system parameters: determining a required threshold; computing a detection statistic for a set of space time sample returns over two consecutive coherent processing intervals for one or more given ranges; comparing said threshold and said detection statistic; and if said detection statistic is greater than or equal to said threshold send an alert that a target exists to a radar operator.

Applicants disclose a method according to the previous paragraph wherein said one or more given ranges comprises a near radar range and a far radar range and one or more ranges in between said near and far radar ranges.

Improving a Radar System

Applicants disclose an improved radar system comprising: a radar radio frequency pulse generator; a signal transmitter; a radar phased array antenna; a pulse compression module; a frequency down conversion module; an analog-to-digital converter; a digital signal processing unit; a decision module; and a control module and radar scheduler said radar system programmed to, for a pre-specified probability of false alarm and a set of pre-specified system parameters: determining a required threshold; compute a detection statistic for a set of space time sample returns over two consecutive coherent processing intervals for one or more given ranges; compare said threshold and said detection statistic; and if said detection statistic is greater than or equal to said threshold send an alert that a target exists to a radar operator. Said alert can be made by said control module.

Applicants disclose the radar system of the previous paragraph wherein said one or more given ranges comprises a near radar range and a far radar range and one or more ranges in between said near and far radar ranges.

Applicants disclose the radar system of the previous two paragraphs, said radar system comprising a data storage module.

Applicants disclose that in one aspect of the radar system disclosed in the three paragraphs above:

a) Said radar RF pulse generator may comprise a Linear Frequency Modulated (LFM) pulse generator that produces a sequence of uniformly spaced Radio Frequency (RF) pulses. The pulse sequence is the input to the signal transmitter.

b) The signal transmitter may amplify the sequence of RF pulses to the required power level and inputs the RF pulses to the set of transmit antenna array elements through a circulator whose function is to isolate the high power level transmit signals and prevent it from getting into the relatively low power level receive channels.

c) The receive phased array antenna is typically a uniformly spaced array of antenna elements. The spacing between adjacent elements is half the carrier wavelength ($\lambda/2$).

d) The clutter and target signal return correspond to the response for LFM pulses. These returns must be pulse compressed such that the return from a point target corresponds to an impulse. The pulse compression module filters the received time signal at each receive antenna unit by a time reversed LFM pulse response.

e) Radio Frequency signals need to be down converted to a suitable Intermediate Frequency (IF) for further processing. The down conversion is done by multiplying (i.e. mixing) the RF signal by the oscillator signal that was used to generate the transmit RF signal. Mixing is performed with the oscillator signals and a 90 degree phase shifted version of the oscillator signal. The pair of outputs are low pass filtered to retain the IF signal referred to as In-phase (I) and Quadrature (Q) components.

f) The function of the Analog-to-Digital processing unit is the digitize the input analog time signal. With higher sampling rates possible, the operation of A/D conversion can be moved further up in the processing chain and much of the remaining processing handled by the digital signal processing unit.

g) The digitized space-time data from all the range cells can be stored in a storage module if required or loaded into random access memory to be processed for real time applications; and h) The overall planning of the task sequence and timing is performed by a control module and radar scheduler. The communication and control is the function of the control module and radar scheduler. The control module communicates with the signal transmitter on when the pulses from each CPI are transmitted. The control module provides the timing needed to align the processes that perform the frequency down conversion, filtering and A/D conversion of signals received at each antenna element, corresponding to each pulse transmitted and all range cells.

In the present invention, the overall planning of the task sequence and timing is typically performed by a control module and radar scheduler; the communication and control is typically a function of the control module and radar scheduler; the control module typically communicates with the signal transmitter on when the pulses from each CPI are transmitted; the control module typically provides the timing needed to align the processes that perform the frequency down conversion, filtering and A/D conversion of signals received at each antenna element, corresponding to each pulse transmitted and all range cells; the DSP unit, typically processes interference-plus-noise training data to compute the N×N Hermitian interference-plus-noise covariance matrix S, and the matrix inverse $S^{-1}$ from which the detection statistic W (specified in Detailed Mathematics of Method section of this specification) is evaluated. For a pre specified probability of false alarm, the required threshold $\eta$ is precomputed using the expressions in specified in Detailed Mathematics of Method section of this specification and the decision module implements the test also specified in specified in Detailed Mathematics of Method section of this specification.

Detailed Mathematics of Method

The mathematical details of Applicants' method are as follows. The acronym CPI denotes Coherent Processing Interval which is the time interval of a burst of pulses that are in phase coherence:

$$Y = [y_1 y_2 \ldots y_K]$$

$$S = \sum_{n=1}^{K} y_n y_n^H$$

Compute sample interference-plus-noise covariance matrix from training data $Z = [z_1 \ z_2]$ received space-time vectors over two consecutive CPIs $$W = \frac{|z_1^H S^{-1} z_2|^2}{(z_1^H S^{-1} z_1)(z_2^H S^{-1} z_2)}$$

Detection Statistic $$W \begin{array}{c} H_1 \\ > \\ < \\ H_0 \end{array} \eta$$

The detection threshold $\eta$ that is used in the Decision Rule above, for a probability of false alarm ($P_{FA}$) that is selected by the party who uses the method is computed from the following equations:

$$P_{FA} = P[W > \eta | H_0] = 1 - \sum_{k=0}^{K-N} G_k f_\beta(1 - \eta; K - N + 1 - k, k + 2)$$

$$f_\beta(z; m, n) = \frac{(n + m - 1)!}{(n - 1)!(m - 1)!} z^{m-1}(1 - z)^{n-1}; 0 \le z \le 1$$

$$G_k = \frac{1}{(L-N+2)!} \sum_{r=0}^{k} \frac{(K-N+1+r)!(1-\eta)^r}{r!} Q_r;$$

$$k = 0, 1, \ldots, K-N$$

$$Q_r = \left[ \int_0^1 \frac{(1-z)^{K-N+2} z^r}{(1-z\eta)^{K-N+2+r}} f_\beta(z; 1, N-1) dz \right]; r = 0, 1, \ldots, K-N$$

wherein the needed variable definitions for the equations above are as follows:

N: Number of degrees of freedom (length of received space-time vector)
K: Number of interference-plus-noise training vectors (K≥N)
Z: Received Space-Time vectors for two consecutive CPIs (N×2)
Y: Interference-plus-noise training vectors (N×K)
S: Sample covariance matrix of interference-plus-noise ($=YY^H$)
W: Detection statistic
η: Precomputed detection threshold
$H_0$: Null hypothesis (i.e. no target present hypothesis)
$H_1$: Alternative hypothesis (i.e. target present hypothesis)

EXAMPLES

The following example illustrates particular properties and advantages of some of the embodiments of the present invention. Furthermore, these are examples of reduction to practice of the present invention and confirmation that the principles described in the present invention are therefore valid but should not be construed as in any way limiting the scope of the invention.

Example: Detection of an Unknown Space-Time Signal Return in Interference and Noise As an example of how the present invention would work, a radar system with signal transmission and reception capability would perform the operation of detecting a signal returned in the following manner. The target may be situated at an unknown range from the radar and at an unknown azimuth angle within the transmit beam and moving at an unknown velocity with respect to the radar. The processing requires receiving the signal returns over two consecutive Coherent Processing Intervals (CPIs). The first sequence of $N_T$ uniformly spaced pulses that constitute CPI #1 are transmitted. After a time, interval determined by the range distance of the hypothesized target from the radar, a sum of the reflected radar clutter (i.e. interference) and a target reflection (if present) is received by each element of a receive antenna array comprising $N_R$ elements. Define $N=N_T \times N_R$, which denotes the number of space-time degrees of freedom. The received signals at each antenna element and over the duration of the first CPI are down converted in frequency, passed through a low pass filter and sampled uniformly with a A/D converter. The sampled complex valued sequence from all receive elements and time duration of a CPI is grouped into a vector of length N elements. Such vectors are formed for all ranges of interest from the radar, with adjacent ranges separated by the width of the range resolution (∂R=c/2B), where B is the bandwidth of the transmitted pulse and c is the speed of light in free space. The set of space-time vectors from a sequence of range cells and for CPI #1 is stored for future processing. A similar set of space-time vectors from the same sequence of range cells and for CPI #2 is obtained and stored for further processing. The time difference between the two CPIs is small that the geometric locations of the range cells in the two cases can be assumed to be the same. The next step is the cancelation of clutter or interference in the received space-time vector in a selected range cell for both CPIs followed by the correlation of the two post clutter cancelled space-time vectors which contain residual clutter and noise. Since the external phases of the two vectors will be uncorrelated, and the false alarm statistic is required to be to be independent of the unknown clutter covariance matrix, the statistic used for correlation is the adaptive cosine estimation (ACE) which is described in the text elsewhere. For a selected range cell for hypothesis test, the training samples for the interference and noise covariance matrix estimation is obtained from K consecutive range cell returns that are in the neighborhood of the test cell. Training samples from both CPIs can be obtained. This detection process does not require testing the received space-time vector with many steering vectors which are the space-time returns from a target at different assumed azimuths within the transmit beam and different target velocities which determines the Doppler shifts. Instead, knowledge that the signal return from two consecutive CPIs is aligned in the same direction is used to perform the correlation-based detection. Note that the target signal amplitudes for the two CPIs can be random. The external phases of the returns from the two CPIs could also be random.

What is claimed is:

1. A method for improving a radar unit's efficiency comprising, for a pre-specified probability of false alarm and a set of pre-specified system parameters:
   a) determining a required threshold η using the following first set of equations:

$$P_{FA} = P[W > \eta | H_0] = 1 - \sum_{k=0}^{K-N} G_k f_\beta(1-\eta; K-N+1-k, k+2)$$

$$f_\beta(z; m, n) = \frac{(n+m-1)!}{(n-1)!(m-1)!} z^{m-1}(1-z)^{n-1}; 0 \le z \le 1$$

$$G_k = \frac{1}{(L-N+2)!} \sum_{r=0}^{k} \frac{(K-N+1+r)!(1-\eta)^r}{r!} Q_r;$$

$$k = 0, 1, \ldots, K-N$$

$$Q_r = \left[ \int_0^1 \frac{(1-z)^{K-N+2} z^r}{(1-z\eta)^{K-N+2+r}} f_\beta(z; 1, N-1) dz \right]; r = 0, 1, \ldots, K-N$$

wherein the variable definitions for said first set of equations are:

N: Number of degrees of freedom (length of received space-time vector)

K: Number of interference-plus-noise training vectors (K≥N)

Z: Received space-time vectors for two consecutive CPIs (N×2)

Y: Interference-plus-noise training vectors (N×K)

S: Sample covariance matrix of interference-plus-noise (=YY$^H$)

W: Detection statistic $\eta$: Precomputed detection threshold $H_0$: Null hypothesis (i.e. no target present hypothesis)

$H_1$: Alternative hypothesis (i.e. target present hypothesis);

b) computing a detection statistic for a set of space time sample returns over two consecutive coherent processing intervals for one or more given ranges using the following second set of equations:

$$Y=[y_1 y_2 \ldots y_K]$$

$$S = \sum_{n=1}^{K} y_n y_n^H$$

Compute sample interference-plus-noise covariance matrix from training data

Z=[$z_1$ $z_2$] received space-time vectors over two consecutive CPIs $$W = \frac{|z_1^H S^{-1} z_2|^2}{(z_1^H S^{-1} z_1)(z_2^H S^{-1} z_2)}$$

Detection Statistic $$W \underset{H_0}{\overset{H_1}{\gtreqless}} \eta$$

Decision Rule;

c) comparing said threshold $\eta$ and said detection statistic; and d) if said detection statistic is greater than or equal to said threshold n send an alert that a target exists to a radar operator.

2. The method of claim 1 wherein said one or more given ranges comprises a near radar range and a far radar range and one or more ranges in between said near and far radar ranges.

3. A radar system comprising:
a) a radar radio frequency pulse generator;
b) a signal transmitter;
c) a radar phased array antenna;
d) a pulse compression module;
e) a frequency down conversion module;
f) an analog-to-digital converter;
g) a digital signal processing unit;
h) a decision module; and
i) a control module and radar scheduler said radar system programmed to, for a pre-specified probability of false alarm and a set of pre-specified system parameters: determining a required threshold $\eta$ using the following first set of equations:

$$P_{FA} = P[W > \eta | H_0] = 1 - \sum_{k=0}^{K-N} G_k f_\beta(1-\eta; K-N+1-k, k+2)$$

$$f_\beta(z; m, n) = \frac{(n+m-1)!}{(n-1)!(m-1)!} z^{m-1}(1-z)^{n-1}; 0 \leq z \leq 1$$

$$G_k = \frac{1}{(L-N+2)!} \sum_{r=0}^{k} \frac{(K-N+1+r)!(1-\eta)^r}{r!} Q_r;$$

$$k = 0, 1, \ldots, K-N$$

$$Q_r = \left[ \int_0^1 \frac{(1-z)^{K-N+2_z r}}{(1-z\eta)^{K-N+2+r}} f_\beta(z; 1, N-1) dz \right]; r = 0, 1, \ldots, K-N$$

wherein the variable definitions for said first set of equations are:

N: Number of degrees of freedom (length of received space-time vector)

K: Number of interference-plus-noise training vectors (K≥N)

Z: Received space-time vectors for two consecutive CPIs (N×2)

Y: Interference-plus-noise training vectors (N×K)

S: Sample covariance matrix of interference-plus-noise (=YY$^H$)

W: Detection statistic $\eta$: Precomputed detection threshold $H_0$: Null hypothesis (i.e. no target present hypothesis)

$H_1$: Alternative hypothesis (i.e. target present hypothesis);

compute a detection statistic for a set of space time sample returns over two consecutive coherent processing intervals for one or more given ranges using the following second set of equations:

$$Y=[y_1 y_2 \ldots y_K]$$

$$S = \sum_{n=1}^{K} y_n y_n^H$$

Compute sample interference-plus-noise covariance matrix from training data

Z=[$z_1$ $z_2$] received space-time vectors over two consecutive CPIs $$W = \frac{|z_1^H S^{-1} z_2|^2}{(z_1^H S^{-1} z_1)(z_2^H S^{-1} z_2)}$$

Detection Statistic $$W \underset{H_0}{\overset{H_1}{\gtreqless}} \eta$$

Decision Rule;

compare said threshold $\eta$ and said detection statistic; and if said detection statistic is greater than or equal to said threshold η send an alert that a target exists to a radar operator.

4. The radar system of claim 3 wherein said one or more given ranges comprises a near radar range and a far radar range and one or more ranges in between said near and far radar ranges.

5. The radar system of claim 4 comprising a data storage module.

6. The radar system of claim 3 comprising a data storage module.

\* \* \* \* \*